Patented Nov. 13, 1951

2,574,972

UNITED STATES PATENT OFFICE 2,574,972

HIGHWAY MARKING PAINT CONTAINING GLASS BEADS

John M. Hill, St. Paul, Minn., assignor to Minnesota Mining & Manufacturing Company, St. Paul, Minn., a corporation of Delaware No Drawing. Application August 6, 1949, Serial No. 109,057

4 Claims. (Cl. 106—228)

This invention relates to a quick-drying highway marking paint containing small transparent glass beads in a state of stable suspension, which is adapted to be sprayed on highway surfaces subject to vehicular traffic to provide durable reflex light-reflective traffic markers that have a high night-time visibility to motorists.

This paint primarily consists of a quick-drying drying-oil-base varnish thinned by a volatile solvent such as naphtha, containing a stably suspended admixture of titanium dioxide pigment, extender pigment, and transparent glass beads (small spheres) having an average diameter of the order of about 3 to about 10 mils. Included in this paint composition is a small proportion of dissolved lecithin which serves to maintain the glass beads in a state of stable suspension but without interfering with the required properties of the beaded paint.

This type of highway marking paint is adapted to be sprayed on highway surfaces subject to vehicular traffic to provide centerlines and other marker and guide lines which have a longer effective service life than do markers formed of paint which does not contain glass beads. The initially applied paint coating has the beads within it. They are surrounded by the pigmented paint vehicle and are firmly bonded to it. The added cost of the glass beads is more than compensated for by the savings resulting from the increase in the effective life of the markers.

After a few weeks of exposure of the markers to vehicular traffic, the portions of the paint film which cover the upper extremities of the beads will have become worn off so as to expose them to incident light from vehicular headlights under night driving conditions. The beads then effectively function as sphere lens elements to cause the phenomenon of "reflex" reflection, thereby increasing the visibility of the markers to motorists at night. This is due to the fact that a greater proportion of the light from the headlights of a vehicle is reflected back toward the vehicle and hence the marker is visible to the driver at a greater distance ahead of the vehicle than would otherwise be the case. The improvement in visibility is particularly striking when driving at night under foggy, misty or rainy conditions, at which times there is particular need for visible markers to promote safety. Under day viewing conditions, the beaded markers have a visibility which is closely comparable to that provided by an ordinary non-beaded paint marker.

The phenomenon of "reflex" reflection is not due to reflection from the beads. The beads act as transparent sphere lenses and refract the incident light rays passing therethrough to the pigmented binder, which provides a concave spherical reflective surface in contact with each bead, and the beads also cause refraction of the reflected rays of light. The beads and the reflective binder form a catadioptric combination which functions to increase the proportion of reflected light which returns toward the vehicle and the driver's eyes. In addition to this there is reflection from the upper, exposed surface of the reflective binder, located between the beads, to provide some additional light which reaches the driver's eyes.

The initial beaded paint marker, wherein the beads are covered with a paint film which has not yet been worn off, has a day and night visibility somewhat superior to that of a non-beaded paint marker, owing to the lenticular surface.

The one-step application procedure using a pre-mixed beaded paint is greatly superior to the old two-step procedure of making beaded marker lines. The two-step procedure involves first coating the highway surface with a suitable reflective paint, and then sprinkling glass beads upon the surface of the coating while it is still in an undried tacky state. The beads sink in sufficiently to become partially embedded and the paint binder rises on the beads, due to capillarity, resulting in depressed cups between the beads in the dried paint film. This two-step procedure results in a beaded marker which is highly vulnerable to the mechanical dislodging tendency of motor vehicle tires passing thereover, resulting in progressive loss of beads, filling of the cavities with dirt, and wearing away of the exposed paint film. The obtaining of an optimum durability is critically dependent upon the composition and viscosity of the paint and the thickness of the wet paint film relative to the diameter of the beads, etc. See, for instance, the extensive discussion in the Shuger patent, No. 2,268,537, issued on December 30, 1941. Bead applicator devices must be used to save labor and to avoid wasting beads. One of the inherent difficulties of the two-step procedure is that wide variations in the conditions of application are encountered which affect the results. The temperature of the highway surface and the atmospheric conditions affect the viscosity and tack and surface adhesion properties of the applied paint coating, and the drying time, which in turn influence the degree of embedding of the layer of applied beads and the strength of adhesive bonding between the beads and the paint. Furthermore, it is difficult to apply the beads in a uniform way without excessive loss of beads which do not become embedded or which are only slightly embedded and quickly become dislodged, and this is especially true when a strong wind is blowing.

Beaded centerlines made by the two-step procedure have an initial night visibility which is greater than that of beaded centerlines made by the one-step procedure from pre-mixed beaded paint, since the beads are exposed from the start to cause reflex reflection. However, a progressive decrease in brilliancy results from the progressive loss of dislodged beads. The brilliancy of a centerline made from pre-mixed beaded paint increases as the paint film becomes worn off from the tops of the beads, and the superior durability of the beaded line makes for a slower decrease in visibility thereafter. The end result is that within a month or two the centerline made by the one-step procedure has become superior in brilliancy and continues to be superior owing to its greater durability.

A pre-mixed beaded highway marking paint is most conveniently and efficiently compounded by a manufacturer under controlled, factory conditions, and supplied in cans or drums to the ultimate users, as against being made up by the user. The beaded paint should, therefore, have a high degree of stability so that the beads will not settle out into a dense layer that cannot easily be redistributed by simple stirring. The beaded paint may undergo considerable periods of standing while in storage, and will be subjected to shaking and vibration during shipment.

The glass beads have a specific gravity of about 2.5, and have a diameter size in the range of about 3 to 10 mils in contrast to pigment particles which are much smaller and often are in the colloidal range. The composition and the surface properties of glass beads also differ from those of pigment particles. Hence, as was to be expected, it was found that those expedients which minimize the settling out of pigment particles are generally ineffective in preventing an undesirable settling out of glass beads. It was also found that paints containing titanium dioxide pigment are particularly vulnerable to the settling out of glass beads, as compared to paints pigmented with chrome yellow, for example. While the inclusion of false-bodying extender pigments, such as powdered asbestine or talc (magnesium silicate), has a beneficial effect, yet it has been found that the degree and rate of settling of glass beads cannot be minimized thereby to the extent desired, especially in the case of paints of the titanium dioxide type, and especially when the paint is subjected to extended storage and shipping conditions.

There is a further inherent difficulty. No antisettling substance should be used which will adversely affect the interfacial bonding between the glass beads and the reflective paint binder in the dried paint coating on the highway. No substance should be used which will result in weakening the bond when it becomes exposed to the atmosphere after the paint film covering the tops of the beads has become worn off, or will cause water to penetrate the interfacial bond. No substance should be used which will interfere with the stability of the paint composition, or prevent efficient application by spraying, or decrease the durability of the dried paint binder. No substance should be used which will materially reduce reflectance and visibility. The suitability of any proposed additive can only be determined by extended testing of the initial beaded paint, followed by extended highway testing to determine whether the beaded marker will stand up under the complex combination of deteriorating influences encountered in actual service.

I have made the empirical discovery that the type of beaded highway marking paint herein described, which contains titanium dioxide pigment and a small proportion of dissolved lecithin, does satisfy the numerous requirements. This beaded paint has gone on the market and has proved its effectiveness in various parts of the country under conditions of actual use by highway authorities in a great many States.

The following is a preferred embodiment of the invention and is set forth for purposes of illustration rather than limitation:

*Example*

| | Parts by weight |
|---|---|
| *Varnish base* | |
| Tung oil | 177 |
| Bodied dehydrated castor oil ("Synthenol Z-3") | 177 |
| Oil-soluble rosin-modified phenolaldehyde varnish resin ("Amberol M-88") | 246 |
| V. M. & P. Naphtha | 600 |
| *Paint composition* | |
| Varnish base | 1,120 |
| Untreated water-dispersible titanium dioxide pigment ("Unitane O R-150") | 720 |
| Magnesium silicate pigment ("Asbestine 151-A") | 480 |
| V. M. & P. Naphtha, about | 192 |
| Transparent glass beads | 1,360 |
| Lecithin solution (70% crude lecithin) ("Yelkin-TTS") | 20 |
| Driers | 15 |

In making the varnish base, the tung oil and phenolaldehyde resin are first heated together to 500° F., the bodied dehydrated castor oil is added, and the mixture is brought back up to 475° F. and held at that temperature until a pill shows a slight draw. The mixture is then cooled to 400° F. and run into the naphtha, to form a homogeneous solution having a preferred viscosity of 100–120 centipoise at 77° F. Solutions having a viscosity within the broader range of about 80–150 cps. may be used.

The pigments and lecithin solution are then mixed into two-thirds of the varnish, and the mixture ground to uniformity on a paint mill. The remainder of the varnish, the glass beads, the drier, and the additional solvent are then added and mixed in, for example by means of a slow speed paddle type mixer. The final composition has a viscosity reading of 85–90 Krebs units (as measured on the Krebs modification of the Stormer viscometer) at 77° F. or about 75 K. U. at 100° F. At this value very little settling either of beads or of pigment is encountered even after several months of normal storage or after cross-country shipping, as will be further elaborated upon hereinbelow. This paint is easily sprayed at 90–110° F., i. e., at temperatures encountered during hot summer weather. The paint can be thinned with naphtha to provide a sprayable viscosity when employed at lower temperatures.

Titanium dioxide, a brilliantly reflective white pigment, may be in part replaced by other suitable pigments such as lithopone, with a corresponding decrease in brilliancy. Powdered magnesium silicate pigment, such as asbestine or talc, reduces the amount of binder varnish required per gallon, and provides a false-body effect (thixotropic effect) which assists in preventing settling of the glass beads during storage. It is an oil-absorptive type of extender pigment. It also improves the surface characteristics of the freshly applied and dried paint film. However, various other extender pigments may be substituted, in whole or in part, for the asbestine of the example; one such material is precipitated calcium carbonate, a non-oil-absorptive extender pigment which exerts a beneficial anti-settling effect as well as serving as an extender.

In the above paint formulation the "pigment volume ratio" is 38%. This ratio value is calculated by dividing the pigment volume (titanium dioxide plus the extender pigment) by the total volume of pigment and non-volatile binder, and multiplying by 100. The volume of the volatile solvent and the volume of the glass beads are not counted in making the calculation. It has been found that the pigment volume ratio is not highly critical and a range of about 25 to 60% is suitable, the higher values being quite satisfactory when the paint is loaded with an extender pigment which is not oil-absorptive (e. g. precipitated calcium carbonate).

Prompt conversion of the paint film to a hard and weatherproof surface is accelerated by the action of conventional metallic driers. The specific mixture used in the example was prepared from 28 parts of cobalt naphthenate solution containing 4% of cobalt, 24 parts of lead naphthenate solution containing 8% of of lead, and 15 parts of manganese naphthenate solution containing 4% of manganese.

The glass beads should have an average diameter of the order of about 3 to about 10 mils. Larger beads decrease the sprayability of the paint, and the beads are less resistant to removal from the dried paint film under the influence of traffic. Extremely fine beads act as fillers or extenders, and in the amount required tend to cause excessive thickening of the paint, and they do not function as effectively as optical elements. A mixture which has given superior results was made up as follows, in proportions by weight, the diameters listed being an average value only:

|  | Per cent |
|---|---|
| No. 10 beads, diameter 5.9 mils | 20 |
| No. 12 beads, diameter 4.7 mils | 55 |
| No. 13 beads, diameter 3.9 mils | 25 |

The No. 10 beads, for example, may include sizes from 9.4 to 4.2 mils diameter, although most of the beads will fall within the limits of 6.6 and 5.2 mils.

The above paint formulation containing a mixture of glass beads of different sizes, as just specified, results in a beaded marker having a dry thickness of about 15 mils, when the beaded paint is applied in the usual amount of about 16 gallons per mile for a four inch width line. The size distribution of the beads results in a packing together of larger and smaller beads and the beaded marker structure has a longer effective service life on this account. When either a large or small bead becomes dislodged due to traffic wear, one or more of the smaller beads will become exposed and will take its place in providing reflex reflection. Thus it has been found that the number of functioning, exposed beads per unit area remains nearly the same during the service life of the marker.

The weight of beads added in the example represents approximately 4.6 lbs. of beads per gallon of the finished paint, or 5.9 lbs. per gallon of bead-free paint. For the size range of beads and the percent of non-volatile binder given, this figure represents an optimum amount. However, as low as about 3 lbs. of beads per gallon of bead-free paint have been found reasonably effective, particularly where an equal weight of pumice particles or similar size was added; and the inclusion of as high as about 8 lbs. of beads per gallon of bead-free paint has not resulted in excessive bead loss in the coated strip.

The lecithin solution employed in the formula consisted of 70 parts of crude soybean lecithin (use being made of "Yelkin-TTS," produced by Archer Daniels Midland Co.), dissolved in 30 parts of a mixture of four parts of VM & P naphtha and one part of xylol. This crude lecithin contains approximately 65% phosphatides and 35% soybean oil. A similar crude soybean lecithin is the NS grade produced by The Glidden Company, which also contains 65% phosphatides and 35% soybean oil. More highly refined grades of lecithin could be used but the crude form is satisfactory and is considerably cheaper. The formula of the example represents an addition of slightly more than ½% of crude lecithin relative to the total weight of pigments and glass beads. From about ½% to about 2½% of the crude lecithin on this basis is found to produce excellent results; less is not as completely effective in maintaining bead suspension, and increased amounts retard the drying of the paint and reduce the firmness of bond between beads and paint. On a phosphatides basis, the corresponding proportions are about 0.3 to 1.6%. The invention is not restricted to the use of soybean lecithin. Thus it has been found that the foregoing beaded paint composition is similarly stabilized by using 0.3% of animal lecithin, practical grade (such as "P683" sold by Eastman Kodak Co.). The previously mentioned crude soybean lecithin is preferred because of its lower cost.

The lecithin is primarily responsible for the substantial elimination of glass bead settling, and especially the settling caused by vibration during shipment. This is illustrated by the results of a settling test in which the paint is allowed to stand in a container for 18 hours on a vibrating plate actuated by a cam which raises and lowers the plate a distance of ⅛ in. at a rate of 1400 cycles per minute. The degree of settling is then measured by pressing the flat end of a cylindrical ⅜ inch rod into the container under a fixed pressure and recording the height of the settled solids through which the rod will not penetrate, in percentage of the total height of the paint sample. Arbitrarily, pressures of 2.52 p. s. i. and 36.2 p. s. i. are used in determining "soft" and "hard" settling respectively. Soft settled material may be readily resuspended by stirring, whereas hard settled material is extremely difficult or impossible to return to suspension by ordinary means available to highway marking crews.

In the following table are shown the settling-test values obtained in the above-described test with a beaded paint made in accordance with the example hereinabove described, contrasted with a control sample of the same paint from which the lecithin was omitted.

| Sample | Soft settling | Hard settling |
|---|---|---|
|  | Per cent | Per cent |
| with lecithin | 2 | 0 |
| without lecithin | 38 | 36 |

Surprisingly, the effectiveness of lecithin addition in preventing the settling of beads and pigment from my beaded paint compositions appears to be affected by the particular type of pigments employed. I have found, for example, that certain yellow beaded highway marking paints containing chrome yellow pigments in place of the titanium dioxide of the example are not prevented from settling by the presence of lecithin when the composition is compounded to a sprayable viscosity. Indeed, exactly the opposite effect has been noted. In a typical sprayable beaded yellow highway paint having the same varnish base, beads and extender pigment as the example, but containing a mixture of chrome yellow pigments in place of the titanium dioxide pigment, the following settling-test results were obtained:

| Sample | Soft settling | Hard settling |
|---|---|---|
| | *Per cent* | *Per cent* |
| with lecithin | 28 | 20 |
| without lecithin | 10 | 6 |

It is quite surprising that settling of glass beads is effectively prevented by lecithin in one composition and yet is greatly increased in another seemingly similar composition.

Beaded paint made in accordance with the principles of this invention may be stored and shipped without loss of sprayability from settling of pigment or beads. In use, as in the painting of highway centerlines, spray application of the paint in a line 4 inches in width and in the amount of approximately 16 gallons per mile, provides a quick-drying, highly durable centerline which develops a reflex light-reflective characteristic within a few weeks so as to have a high night-time visibility to motorists.

I claim:

1. A reflective highway marking paint composition essentially comprising a quick-drying drying-oil base varnish thinned by a volatile solvent and containing a stably suspended admixture of titanium dioxide pigment, extender pigment, transparent glass beads having an average diameter of the order of about 3 to about 10 mils, and a small proportion of dissolved lecithin in amount sufficient to stabilize the suspension of glass beads, said paint composition being adapted to be sprayed on highway surfaces subject to vehicular traffic to provide durable reflex light-reflective markers which have a high night-time visibility to motorists.

2. A sprayable paint composition according to claim 1 wherein the pigment volume ratio is in the range of about 25 to 60% and the proportion of glass beads is about 3 to 8 pounds per gallon of bead-free paint.

3. A paint composition according to claim 1 wherein magnesium silicate extender pigment is utilized.

4. A paint composition according to claim 1 wherein precipitated calcium carbonate extender pigment is utilized.

JOHN M. HILL.

UNITED STATES PATENTS

The following references are of record in the file of this patent:

REFERENCES CITED

| Number | Name | Date |
|---|---|---|
| 2,268,537 | Shuger | Dec. 30, 1941 |
| 2,346,124 | Dew | Apr. 4, 1944 |